United States Patent Office 2,743,286
Patented Apr. 24, 1956

2,743,286
PROCESS FOR PREPARING ALKOXYQUINONE COMPOUNDS

George F. Rodgers, Kingsport, Tenn., assignor to Eastman Kodak Company, Rochester, N. Y., a corporation of New Jersey No Drawing. Application March 12, 1952, Serial No. 276,219

8 Claims. (Cl. 260—396)

This invention relates to an improved process for preparing alkoxy-1,4-quinones. It is especially directed to an improved process for preparing 2,5-dimethoxy-1,4-benzoquinone.

The preparation of 2,5-dimethoxy-1,4-benzoquinone from 1,4-benzoquinone and methyl alcohol in the presence of zinc chloride is described by Knovenagel and Buckel (Berichte volume 34, page 3993, 1901). They obtained a yield of 32.5% based on the 1,4-benzoquinone used.

Diels and Kassebart (Annalen volume 530, page 51, 1937) obtained 2,5-dimethoxy-1,4-benzoquinone in a 15% yield by reacting the product from 1,4-benzoquinone, pyridine and formic acid with methyl alcohol.

It is an object of my invention to provide an improved process for preparing alkoxy-1,4-quinones, especially 2,5-dialkoxy-1,4-benzoquinones. A particular object is to provide an improved process for preparing 2,5-dimethoxy-1,4-benzoquinone.

I have discovered that substantially increased yields of alkoxy-1,4-quinones can be obtained by reacting a 1,4-quinone with zinc chloride and an alcohol having the formula $C_nH_{2n+1}OH$, wherein $n$ represents a whole number from 1 to 4, inclusive, in the presence of an alkali metal chlorate and vanadium pentoxide. The reaction also takes place when the dihydroxy form of the 1,4-quinone is employed instead of the 1,4-quinone but the yields of product obtained do not appear to be as high as when the quinone form is used.

When 2,5-dimethoxy-1,4-benzoquinone, for example, is prepared in accordance with the process of my invention, yields of the order of 65–70% are readily obtainable whereas when the method described by Knovenagel and Buckel is employed, the yield is of the order of 32.5%. The vastly superior results obtained with the process of the present invention could not have been predicted.

In carrying out the process of my invention, substantially anhydrous reactants are employed and no water is added during the reaction. Anhydrous conditions appear to be desirable. As shown in Example 4 hereinafter, added water apparently decreases the yield.

The 1,4-quinone compounds and the dihydroxy form thereof employed in carrying out the process of my invention should have a position capable of being substituted with an alkoxy group. Suitable compounds include, for example, 1,4-benzoquinone, 2,3,5-trimethyl-1,4-benzoquinone, 1,4-dihydroxybenzene, 2,3,5-trimethyl-1,4-dihydroxybenzene, 1,4-naphthoquinone, 2-methyl-1,4-naphthoquinone, 1,4-dihydroxynaphthalene and 2-methyl-1,4-dihydroxynaphthalene. In all these compounds it is noted that at least one of the positions ortho to the keto or hydroxy groups is unoccupied.

Alcohols that can be used in carrying out the process of my invention include methyl alcohol, ethyl alcohol, n-propyl alcohol, isopropyl alcohol, n-butyl alcohol and secondary butyl alcohol, for example. I have found that the use of a large excess of alcohol over that required to react with the quinone is desirable. Normally the mole ratio of the alcohol to the quinone is at least 10 to 1.

The use of methyl alcohol to quinone in a mole ratio of 5 to 1 gave a very impure product and when smaller amounts of methyl alcohol were used, a fire and explosion hazard, due to overheating of the alkali metal chlorate, was observed.

When the dihydroxy form of the 1,4-quinone is employed, at least sufficient alkali metal chlorate is employed to oxidize the dihydroxy compound to its quinone form. Sodium chlorate and potassium chlorate are illustrative of the alkali metal chlorates that can be used in carrying out the process of my invention. When a 1,4-quinone is employed, less than 1 mole of the alkali metal chlorate per mole of the quinone compound is required for good results. As seen from Examples 1 and 2, the use of about .6 mole of sodium chlorate per mole of 1,4-benzoquinone gave good results. Vanadium pentoxide apparently acts as a catalyst and need be used only in catalytic amounts.

The amount of zinc chloride used does not appear to be critical. Essentially equivalent yields of 2,5-dimethoxy-1,4-benzoquinone were obtained using 60 grams of anhydrous zinc chloride per gram mole of quinone and by using 130 grams of anhydrous zinc chloride per gram mole of quinone.

Temperatures of from about 40° C. to the refluxing temperature of the reaction mixture can be used in carrying out the process of the invention. The reaction proceeds appreciably slower at lower temperatures, although good yields have been obtained by operating at 40° C. for twelve hours. At temperatures below about 40° C. the reaction proceeds so slowly as to be impractical. The time required to obtain maximum yields of product varies with the temperature at which the reaction is carried out. At reflux temperature the yield is not increased appreciably by increasing the heating time from 5 to 16 hours. Reflux periods of less than 5 hours result in lower yields.

The following examples illustrate the process of my invention.

*Example 1*

125 grams of zinc chloride were fused and poured slowly into 500 ccs. of methyl alcohol and 108 grams of 1,4-benzoquinone, 0.5 gram of vanadium pentoxide and 60 grams of sodium chlorate were added and the resulting reaction mixture was stirred and refluxed for 7 hours. The reaction mixture was allowed to stand for 9 hours, after which it was again refluxed for 1 hour. The reaction mixture thus obtained was then cooled and filtered. The product obtained on the filter was washed well with water and then dried. 117 grams of 2,5-dimethoxy-1,4-benzoquinone were thus obtained (69.5% yield).

*Example 2*

2000 ccs. of methyl alcohol, 216 grams of 1,4-benzoquinone, 144 grams of sodium chlorate and 0.5 gram of vanadium pentoxide were placed in a 3-liter round bottomed flask and then 276 grams of anhydrous zinc chloride were added, while stirring. The reaction mixture thus obtained was stirred and heated to 55° C. for 1 hour and then heated, with stirring, to reflux for 4 hours and cooled. The reaction mixture thus obtained was filtered and the reaction product, consisting essentially of 2,5-dimethoxy-1,4-benzoquinone, collected on the filter was washed first with methyl alcohol and then with water. The yield of dry product was 224.5 grams (67% yield).

*Example 3*

500 ccs. of methyl alcohol, 55 grams of 1,4-dihydroxybenzene, 54 grams of sodium chlorate, 0.2 gram of vanadium pentoxide and 60 grams of anhydrous zinc chloride were placed in a suitable reaction vessel and heated at reflux temperature, with stirring, for 5 hours and then cooled. The reaction mixture thus obtained was filtered and the 2,5-dihydroxy-1,4-benzoquinone recovered on the filter was washed with methyl alcohol and then with water. The yield of dry product was 43 grams (51% yield).

*Example 4*

500 ccs. of methyl alcohol, 55 grams of 1,4-dihydroxybenzene, 54 grams of sodium chlorate, 0.2 gram of vanadium pentoxide, 10 ccs. of water and 60 grams of anhydrous zinc chloride were mixed together in a suitable reaction vessel and heated at reflux temperature, with stirring, for 5 hours. Upon cooling, the reaction mixture was filtered and the 2,5-dimethoxy-1,4-benzoquinone collected on the filter was washed with methyl alcohol and then with water. The yield of dry product was 35 grams (42% yield).

The reactants employed in Examples 1, 2, 3 and 4 were used in anhydrous or substantially anhydrous condition.

Following the procedure described hereinbefore, the following compounds are readily prepared, 2,5-diethoxy-1,4-benzoquinone (from 1,4-benzoquinone and ethyl alcohol), 2,5-di-n-propoxy-1,4-benzoquinone (from 1,4-benzoquinone and n-propyl alcohol), 2,5-diisopropoxy-1,4-benzoquinone (from 1,4-benzoquinone and isopropyl alcohol), 2,5-di-n-butoxy-1,4-benzoquinone (from 1,4-benzoquinone and n-butyl alcohol), 2-methoxy-1,4-naphthoquinone (from 1,4-naphthoquinone and methyl alcohol), 2-ethoxy-1,4-naphthoquinone (from 1,4-naphthoquinone and ethyl alcohol) and 2,3,5-trimethyl-6-methoxy-1,4-benzoquinone (from 2,3,5-trimethyl-1,4-benzoquinone and methyl alcohol).

2,5-dimethoxy-1,4-benzoquinone is useful as a bodying agent for drying oils. It is the starting material for the manufacture of 2,5-dimethoxy-1,4-dihydroxybenzene, which has interesting properties as a polymerization inhibitor (see British Patent 486,537), and for use in photographic work.

I claim:

1. In the process for preparing a 1,4-quinone having an alkoxy group in an ortho position to at least one of the ketone groups by reacting a member selected from the group consisting of 1,4-benzoquinone, 1,4-naphthoquinone, 1,4-dihydroxybenzene, 1,4-dihydroxynaphthalene and said compounds containing a nuclear methyl group as the sole substituent with zinc chloride and an alcohol having the formula $C_nH_{2n+1}OH$, wherein $n$ is a whole number from 1 to 4, inclusive, the improvement which comprises carrying out the reaction in the presence of an alkali metal chlorate and vanadium pentoxide and wherein the reaction is initiated under substantially anhydrous conditions and no water is added to the reaction mixture during the reaction.

2. In the process for preparing a 1,4-quinone having an alkoxy group in an ortho position to at least one of the ketone groups by reacting a member selected from the group consisting of 1,4-benzoquinone, 1,4-naphthoquinone, 1,4-dihydroxybenzene, 1,4-dihydroxynaphthalene and said compounds containing a nuclear methyl group as a sole substituent with zinc chloride and an alcohol having the formula $C_nH_{2n+1}OH$, wherein $n$ is a whole number from 1 to 4, inclusive, the improvement which comprises carrying out the reaction in the presence of an alkali metal chlorate and vanadium pentoxide and wherein the reaction is initiated under substantially anhydrous conditions and no water is added to the reaction mixture during the reaction and wherein the mole ratio of the alcohol to the aforementioned 1,4-quinone and 1,4-dihydroxy compounds is at least 10 to 1.

3. In the process for preparing a 2,5-dialkoxy-1,4-benzoquinone by reacting 1,4-benzoquinone with zinc chloride and an alcohol having the formula $C_nH_{2n+1}OH$, wherein $n$ is a whole number from 1 to 4, inclusive, the improvement which comprises carrying out the reaction in the presence of an alkali metal chlorate and vanadium pentoxide and wherein the reaction is initiated under substantially anhydrous conditions and no water is added to the reaction mixture during the reaction.

4. In the process for preparing a 2,5-dialkoxy-1,4-benzoquinone by reacting 1,4-benzoquinone with zinc chloride and an alcohol having the formula $C_nH_{2n+1}OH$, wherein $n$ is a whole number from 1 to 4, inclusive, the improvement which comprises carrying out the reaction in the presence of an alkali metal chlorate and vanadium pentoxide and wherein the reaction is initiated under substantially anhydrous conditions and no water is added to the reaction mixture during the reaction and wherein the mole ratio of the alcohol to the 1,4-benzoquinone is at least 10 to 1.

5. In the process for preparing 2,5-dimethoxy-1,4-benzoquinone by reacting 1,4-benzoquinone with zinc chloride and methyl alcohol, the improvement which comprises carrying out the reaction in the presence of an alkali metal chlorate and vanadium pentoxide and wherein the reaction is initiated under substantially anhydrous conditions and no water is added to the reaction mixture during the reaction.

6. In the process for preparing 2,5-dimethoxy-1,4-benzoquinone by reacting 1,4-benzoquinone with zinc chloride and methyl alcohol, the improvement which comprises carrying out the reaction in the presence of an alkali metal chlorate and vanadium pentoxide and wherein the reaction is initiated under substantially anhydrous conditions and no water is added to the reaction mixture during the reaction and wherein the mole ratio of the methyl alcohol to the 1,4-benzoquinone is at least 10 to 1.

7. In the process for preparing 2,5-dimethoxy-1,4-benzoquinone by reacting 1,4-benzoquinone with zinc chloride and methyl alcohol, the improvement which comprises carrying out the reaction in the presence of sodium chlorate and vanadium pentoxide and wherein the reaction is initiated under substantially anhydrous conditions and no water is added to the reaction mixture during the reaction.

8. In the process for preparing 2,5-dimethoxy-1,4-benzoquinone by reacting 1,4-benzoquinone with zinc chloride and methyl alcohol, the improvement which comprises carrying out the reaction in the presence of sodium chlorate and vanadium pentoxide and wherein the reaction is initiated under substantially anhydrous conditions and no water is added to the reaction mixture during the reaction and wherein the mole ratio of the methyl alcohol to the 1,4-benzoquinone is at least 10 to 1.

References Cited in the file of this patent

FOREIGN PATENTS

| | | |
|---|---|---|
| 153,480 | Switzerland | June 16, 1932 |
| 509,890 | Great Britain | July 20, 1939 |

OTHER REFERENCES

Konovenagel et al.: Ber. Deut. Chem., vol. 34, pp. 3993–98, 1901.

Blatt: Organic Synthesis-Collective, vol. II (1943) p. 553.